UNITED STATES PATENT OFFICE.

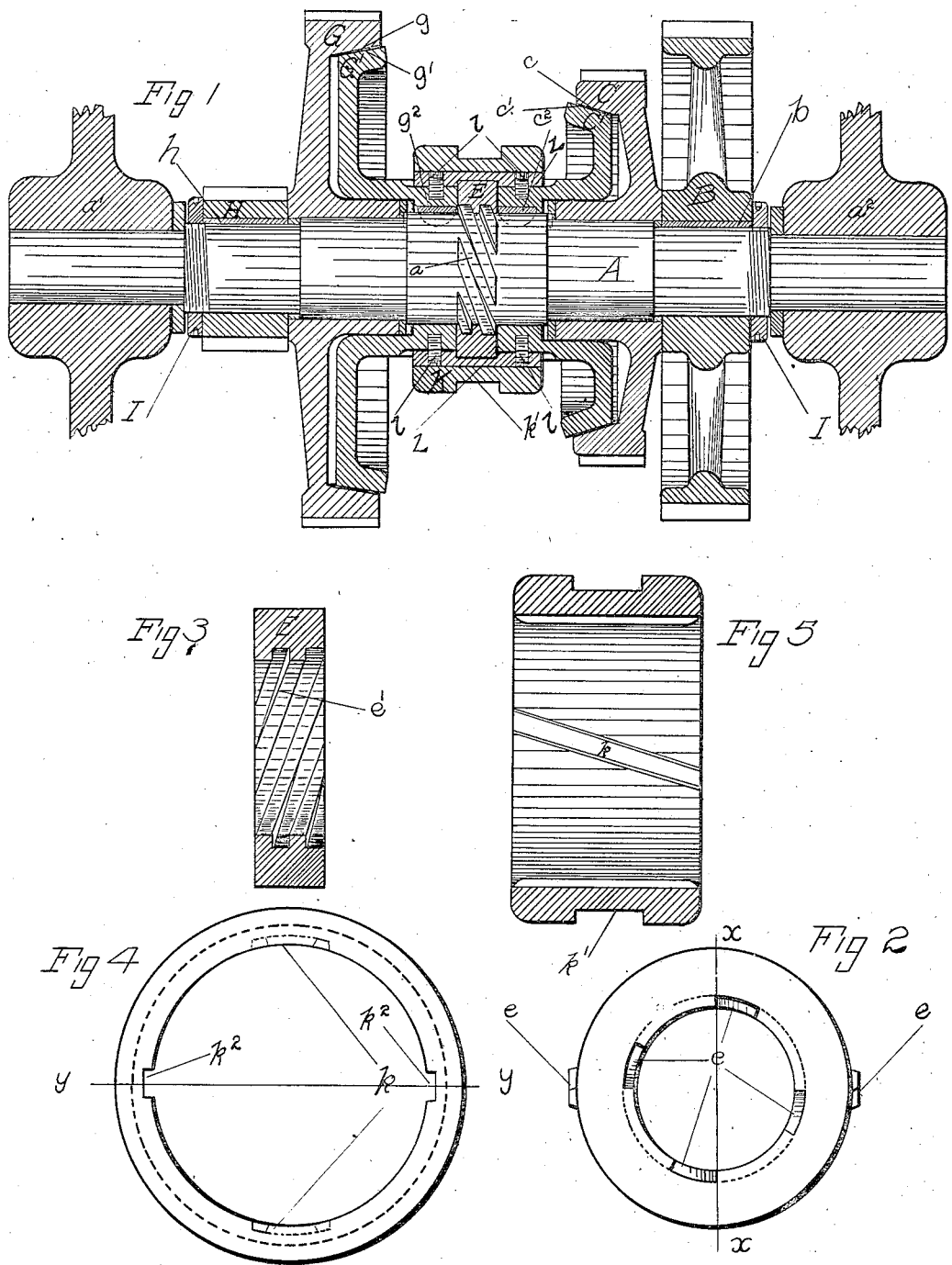

EDWARD A. MULLER, OF MADISONVILLE, OHIO, ASSIGNOR TO THE KING MACHINE TOOL COMPANY, OF WINTON PLACE, OHIO, A CORPORATION OF OHIO.

FRICTION-CLUTCH.

No. 824,805.      Specification of Letters Patent.      Patented July 3, 1906.

Application filed July 3, 1905. Serial No. 268,184.

*To all whom it may concern:*

Be it known that I, EDWARD A. MULLER, a citizen of the United States, residing at Madisonville, in the county of Hamilton and State of Ohio, have invented new and useful Improvements in Friction-Clutches, of which the following is a specification.

This invention relates to improvements in friction-clutches, more particularly those applicable to machine-tools.

In types of friction-clutches where toggles and springs are used total or partial accidental release is apt to occur. My improved clutch has no tendency to accidental release, its action is positive, and the clutch is symmetrical as to weight.

My invention is illustrated in the accompanying drawings, in which—

Figure 1 is an assembly sectional drawing of a shaft carrying two gears provided with my improved friction-clutches and other essential parts. Fig. 2 is a plan view of friction-nut. Fig. 3 is a longitudinal section of friction-nut along the line $x\ x$ in Fig. 2. Fig. 4 is a plan view of friction cam-sleeve. Fig. 5 is a longitudinal section of cam-sleeve along line $y\ y$ in Fig. 4.

Referring to the drawings, A represents the shaft, in this case having different diameters at different points. Shaft A is journaled at $a'\ a^2$ in the housing. At a convenient point on the shaft A is a thread $a$ of suitable pitch, shown in the drawings as a quadruple thread of coarse pitch. A suitably-threaded nut E is provided to operate on said thread $a$. Closely abutting nut E on either side are friction members $G'\ C'$, adapted to rotatively engage by friction transmitting-gears G and C, respectively, which are normally loose on shaft A. In the particular embodiment of my invention selected for illustration friction members $G'\ C'$ have beveled surfaces $g'\ c'$, adapted to seat closely upon beveled surfaces $g\ c$, respective of gears G and C, and pressure of these beveled surfaces together insures ample holding contact. Friction members $G'\ C'$ are slidably keyed to the shaft A by keys $g^2\ c^2$, respectively.

Keys L L not only serve to span nut E and hold friction members $G'\ C'$ in correct relations to the nut and each other by the screws $l$, but rotatively connect sleeve K with the shifting portions of clutches already described, while allowing lateral movement of said sleeve K.

Sleeve K is shifted in the usual way by yoke and lever (not shown) operating in the circumferential slot $k'$.

Nut E has on its exterior helical projections $e\ e$, preferably perpendicular to threads $a$ on the shaft or the corresponding threads $e'$ on the interior of the nut.

Sleeve K has in its inner surface helical grooves $k\ k$, adapted to engage projections $e\ e$. It also has keyways $k^2\ k^2$, adapted to receive keys L L.

Driving-gears B and H are securely keyed to the shaft A by keys $b\ h$, respectively. The whole mechanism is held in proper relative position by nuts I I or in any other convenient manner.

The operation is as follows: Sleeve K being forced to the right (see Fig. 1) toward C and being held against rotation by keys L L turns the nut E as if the top side was coming toward the observer by means of the helical recess of the sleeve bearing against the helical projections of the nut. This rotation of the nut E carries the nut on the threads $a$ toward the gear C, and the nut bears against and carries with it friction member $C'$, causing it to rotatively contact with the transmitting-gear C. Friction members $C'$ and $G'$ being tied by keys L through screws $l$ $G'$ are simultaneously carried out of rotative contact with gear G and securely held so. As friction members $G'$ and $C'$ are keyed to the shaft A, they rotate with it. Hence complete operation is shown. Reverse movement of sleeve K produces the opposite result, securing operation of gear G and preventing operation of gear C. The greater the pressure on sleeve K the tighter the fit of one inner friction member in its friction-bell; yet whatever the degree of pressure applied it remains the same, without danger of accidental release, because the angle of the threads $a$ is within the angle of rest. No force in the direction of the length of the shaft and normal to the diametrical plane of the nut could move the nut unless the force was so great as to strip the threads or break the nut.

I claim as my invention and desire to secure by Letters Patent of the United States—

1. The combination of a shaft having a threaded portion intermediate of its ends, a pair of friction members loose on said shaft, friction members splined to said shaft and located one upon each side of the threaded portion of said shaft, a nut on said shaft between the adjacent ends of the friction members and engaging said threaded portion of the shaft, a shiftable sleeve concentric with the nut, and means whereby the nut is given a partial rotation by, and in unison with, the shifting of the sleeve.

2. A friction-clutch comprising a shaft and friction members loose thereon and spaced from each other, other friction members splined to the shaft and located between the first-named members, said shaft having an exteriorly-threaded portion located intermediate of the second-named friction members, a nut engaging said threaded portion of the shaft, and adapted to endwise engage the second-named friction members, a slidable sleeve concentric with the nut, and means intermediate of the sleeve and nut for rotating the latter in unison with the shifting of said sleeve.

3. In combination with a shaft, a pair of revolving members C G, normally loose thereon, friction members C′, G′ respectively splined to said shaft, said shaft A having an exterior thread $a$, between said friction members, a nut E adapted to operate on said shaft-thread and having exterior helical projections $e$, members L, attached to and yoking together members C′ and G′, shifter-sleeve K with helical grooves $k$, adapted to receive projections $e$, and means for moving the sleeve K, in either direction longitudinally of said shaft.

In testimony whereof I have hereunto set my hand in presence of two subscribing witnesses.

EDWARD A. MULLER.

Witnesses:
   JOSEPH R. GARDNER,
   CARROLL H. RICHARDS.